(12) United States Patent
You et al.

(10) Patent No.: US 10,866,086 B2
(45) Date of Patent: Dec. 15, 2020

(54) STRUCTURED-LIGHT PROJECTOR AND ELECTRONIC APPARATUS INCLUDING STRUCTURED-LIGHT PROJECTOR

(71) Applicant: SAMSUNG ELECTRONICS CO., LTD., Suwon-si (KR)

(72) Inventors: Jangwoo You, Seoul (KR); Seunghoon Han, Seoul (KR); Namseop Kwon, Suwon-si (KR); Byunghoon Na, Suwon-si (KR); Minkyung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 156 days.

(21) Appl. No.: 16/248,917

(22) Filed: Jan. 16, 2019

(65) Prior Publication Data
US 2020/0041886 A1 Feb. 6, 2020

(30) Foreign Application Priority Data
Aug. 2, 2018 (KR) .................. 10-2018-0090404

(51) Int. Cl.
*G01B 11/25* (2006.01)
*G02B 27/42* (2006.01)
*G03B 21/20* (2006.01)

(52) U.S. Cl.
CPC .............. *G01B 11/25* (2013.01); *G02B 27/42* (2013.01); *G03B 21/2066* (2013.01)

(58) Field of Classification Search
CPC ...... G01B 11/22; G01B 11/25; G01B 11/2513; G02B 27/42; G02B 27/4205; G02B 27/4233
See application file for complete search history.

(56) References Cited

U.S. PATENT DOCUMENTS

| | | | |
|---|---|---|---|
| 9,454,069 | B2 | 9/2016 | Tanaka et al. |
| 9,478,099 | B2 | 10/2016 | Czyzewski et al. |
| 9,778,478 | B1 | 10/2017 | Adema et al. |
| 2012/0182537 | A1 | 7/2012 | Yakunin et al. |
| 2016/0191867 | A1 | 6/2016 | Abraham |
| 2019/0139243 | A1* | 5/2019 | You .................. H04N 13/254 |

FOREIGN PATENT DOCUMENTS

| | | |
|---|---|---|
| JP | 4572989 B2 | 11/2010 |
| KR | 10-2009-0077748 A | 7/2009 |
| KR | 10-2012-0073240 A | 7/2012 |

* cited by examiner

*Primary Examiner* — Ryan D Howard
(74) *Attorney, Agent, or Firm* — Sughrue Mion, PLLC

(57) ABSTRACT

A structured-light projector includes an illuminating device configured to emit illumination light, a pattern mask configured to partially transmit the illumination light to generate structured light, and a lens configured to transmit the structured light, wherein the pattern mask includes a light-transmitting slit configured to transmit the illumination light, and a plurality of reflection patterns configured to obliquely reflect the illumination light toward the light-transmitting slit.

23 Claims, 11 Drawing Sheets

STRUCTURED-LIGHT PROJECTOR AND ELECTRONIC APPARATUS INCLUDING STRUCTURED-LIGHT PROJECTOR

CROSS-REFERENCE TO RELATED APPLICATION

This application claims priority from Korean Patent Application No. 10-2018-0090404, filed on Aug. 2, 2018 in the Korean Intellectual Property Office, the disclosure of which is incorporated herein in its entirety by reference.

BACKGROUND

1. Field

Example embodiments of the present disclosure relate to a structured-light projector and an electronic apparatus including the structured-light projector, and more particularly, to a structured-light projector with improved light utilization efficiency and an electronic apparatus including the structured-light projector.

2. Description of the Related Art

Recently, for the recognition of objects such as humans and other objects, it is increasingly necessary to accurately identify shapes, positions, and movements of objects by precise three-dimensional shape recognition. As one of the methods for achieving accurate identification, a three-dimensional sensing technique using structured light has been developed, which enables a more accurate motion recognition.

Such structure d-light systems have recently been required to be gradually miniaturized and provided with a higher resolution in order to be combined with various electronic apparatuses. Optical components such as a diffractive element (DOE) may be used to produce structured light, and optical properties of these optical components are factors that may affect design precision and fabrication requirements.

SUMMARY

According to an aspect of an example embodiment, there is provided a structured-light projector including an illuminating device configured to emit illumination light, a pattern mask configured to partially transmit the illumination light to generate structured light, and a lens configured to transmit the structured light, wherein the pattern mask includes a light-transmitting slit configured to transmit the illumination light, and a plurality of reflection patterns configured to obliquely reflect the illumination light toward the light-transmitting slit.

The structured-light projector, wherein each of the plurality of reflection patterns may include a bottom surface, a tip portion opposite to the bottom surface, and a reflective surface obliquely extending from an edge of the bottom surface to the tip portion, wherein the reflective surface is inclined to obliquely reflect the illumination light.

The structured-light projector, wherein a ratio of a height of each of the plurality of the reflection patterns to a width of the bottom surface of each of the plurality of the reflection patterns may be in a range of 5 to 15.

The structured-light projector, wherein an internal angle of the tip portion may be in a range of 10 degrees to 20 degrees.

The reflective surface may have a curved surface and the tip portion may have a curved surface.

The structured-light projector may further include a transparent substrate spaced apart from the illuminating device, wherein the pattern mask is disposed on a first surface of the transparent substrate, and the bottom surface of each of the plurality of reflection patterns is in contact with the first surface of the transparent substrate.

The lens may be disposed on a second surface of the transparent substrate, the second surface being opposite to the first surface of the transparent substrate, and the lens may be a meta-lens comprising a plurality of nano-sized columns.

The pattern mask may include a first lens distortion compensation region disposed opposite to a central portion of the lens and a second lens distortion compensation region surrounding the first lens distortion compensation region, and the first lens distortion compensation region and the second lens distortion compensation region may be disposed concentrically.

The structured-light projector, wherein a width of the bottom surface of each of the plurality of the reflection patterns included in the first lens distortion compensation region may be greater than a width of the bottom surface of each of the plurality of the reflection patterns included in the second lens distortion compensation region, and a width of the light-transmitting slit included in the first lens distortion compensation region may be less than a width of the light-transmitting slit included in the second lens distortion compensation region.

The structured-light projector, wherein a height of each of the plurality of reflection patterns included in the first lens distortion compensation region may be the same as a height of each of the plurality of the reflection patterns included in the second lens distortion compensation region.

The structured-light projector, wherein a ratio of the height to the width of the bottom surface of each of the plurality of the reflection patterns included in the first lens distortion compensation region may be less than a ratio of the height to the width of each of the plurality of reflection patterns included in the second lens distortion compensation region.

The structured-light projector, wherein a height of each of the plurality of the reflection patterns included in the first lens distortion compensation region may be greater than a height of each of the plurality of the reflection patterns included in the second lens distortion compensation region.

The structured-light projector, wherein a ratio of the height to the width of the bottom surface of each of the plurality of reflection patterns included in the first lens distortion compensation region may be the same as a ratio of the height to the width of the bottom surface of each of the plurality of reflection patterns included in the second lens distortion compensation region.

The structured-light projector, wherein a ratio of a total area of the light-transmitting slit to a total area of the bottom surfaces of the reflection patterns included in the second lens distortion compensation region may be greater than a ratio of a total area of the light-transmitting slit to a total area of the bottom surfaces of the reflection patterns included in the first lens distortion compensation region.

The structured-light projector, wherein each of the plurality of reflection patterns may have a longitudinal section of a triangle shape or a trapezoidal shape.

The structured-light projector, wherein each of the plurality of reflection patterns may include a reflective metal material.

The structured-light projector, wherein each of the plurality of reflection patterns may include a core portion and an external portion surrounding a surface of the core portion, and wherein the external portion may include a reflective metal material.

The core portion may have a longitudinal cross-section of a triangle shape or a trapezoidal shape.

The pattern mask may further include a transparent high-refractive-index layer disposed to cover the light-transmitting slit and the plurality of reflection patterns.

The plurality of reflection patterns may include a dielectric material having a refractive index that is lower than a refractive index of the high-refractive-index layer.

The structured-light projector, wherein each of the reflection patterns may include a bottom surface and a reflective surface obliquely extending from an edge of the bottom surface, and an internal angle of the reflective surface with the bottom surface may be greater than a critical angle.

The lens may be a refractive optical lens spaced apart from the pattern mask.

According to an aspect of another example embodiment, there is provided an electronic apparatus including a structured-light projector configured to generate structured light to an object, a sensor configured to receive light reflected from the object, and a processor configured to obtain shape information of the object based on the light received from the sensor, wherein the structured-light projector includes an illuminating device configured to emit illumination light, a pattern mask configured to partially transmit the illumination light to generate structured light, and a lens configured to transmit the structured light, wherein the pattern mask includes a light-transmitting slit configured to transmit the illumination light, and a plurality of reflection patterns configured to obliquely reflect the illumination light toward the light-transmitting slit.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
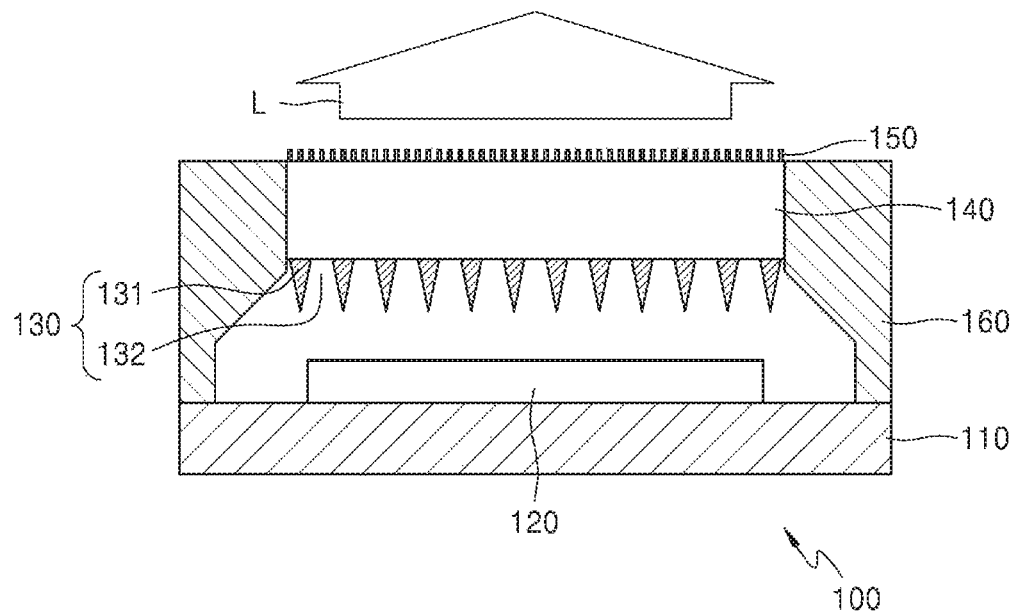
FIG. 1 is a cross-sectional view of a schematic configuration of a structured-light projector according to an example embodiment.

Reference will now be made in detail to example embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects.

Throughout the specification, it will also be understood that when a component "includes" or "comprises" an element, unless there is another opposite description thereto, it should be understood that the component does not exclude another element but may further include another element. It will be further understood that the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The case where a position relationship between two items is described with the terms "on," "on the top of," or the like, one or more items may be interposed therebetween unless the term "directly" is used in the expression.

Hereinafter, with reference to the accompanying drawings, a structured-light projector and an electronic apparatus including the structured-light projector will now be described in detail. Like reference numerals in the drawings denote like elements. Sizes of components in the drawings may be exaggerated for convenience of explanation. The example embodiments described below are merely illustrative, and various modifications are possible from these example embodiments.

FIG. 1 is a cross-sectional view of a schematic configuration of a structured-light projector 100, according to an example embodiment. Referring to FIG. 1, the structured-light projector 100 may include an illuminating device 120 providing illumination light, a pattern mask 130 that partially transmits the illumination light to produce structured light, and a lens 150 configured to project the structured light. In addition, the structured-light projector 100 may further include a supporting member 110 supporting the illuminating device 120, a transparent substrate 140 supporting the pattern mask 130 and the lens 150, and a housing 160 fixing the transparent substrate 140 to be spaced apart from the illuminating device 120 by a distance. A lower end of the housing 160 may be combined with the supporting member 110, and the transparent substrate 140 may be fixed to an upper end of the housing 160.

The illuminating device 120 may include a plurality of light-emitting elements arranged in a form of a two-dimensional array. The light-emitting element may be a laser diode emitting laser light. For example, the light-emitting element may be a vertical cavity surface emitting laser (VCSEL). When the light-emitting element is the VCSEL, the light-emitting element may include an active layer including a III-V group semiconductor material or a II-VI group semiconductor material and having a multi-quantum well structure. However, the lighting-emitting element is not limited to the VCSEL, and the light-emitting element may be a laser diode other than the VCSEL or a light-emitting diode. The light-emitting element may emit laser light of approximately 850 nm or 940 nm, or may emit light in a wavelength band of near infrared rays. However, the wavelength of the light-emitting element is not particularly limited, and a light-emitting element that emits light in a wavelength band that may be used for an application utilizing the structured light may be used.

The lens 150 may be arranged on an upper surface of the transparent substrate 140, opposite to the pattern mask. The lens 150 may be, for example, a metalens including nano-sized fine nano-columns. The nano-columns may have a sub-wavelength size which is less than the wavelength of light emitted from the illuminating device 120. For example, a diameter of each of the nano-columns and an array pitch of a plurality of nano-columns may be less than one-half the wavelength of the light emitted from the illuminating device 120. Optical properties of the lens 150 may be determined according to a height and diameter of the nano-columns, the array pitch of the nano-columns, and an arrangement form of the nano-columns. For example, the nano-columns may be arranged such that the lens 150 may serve as a convex lens or a condenser lens that collects and focuses light on a focal plane. When the lens 150 includes the plurality of nano-columns, the lens 150 may be formed to have a relatively small thickness compared with a general refractive optical lens, and higher-order diffraction may be reduced or suppressed over a wide angular range as compared with a general diffraction optical lens. Thus, the structured-light projector 100 may have a relatively small size. For example, a height of the structured-light projector 100 may be about 4 mm or less.

The lens may include a material having a refractive index higher than a refractive index of the transparent substrate 140. For example, the refractive index of the lens 150 may be greater by 1 or more than the refractive index of the transparent substrate 140. A material of the lens 150 may include, for example, a monocrystalline silicon, a polysilicon (Poly-Si), an amorphous silicon, silicon nitride ($Si_3N_4$), gallium phosphide (GaP), titanium dioxide ($TiO_2$), aluminum antimonide (AlSb), alumanylidynearsane (AlAs), aluminium gallium arsenide (AlGaAs), aluminium gallium indium phosphide (AlGaInP), boron phosphide (BP), zinc germanium diphosphide ($ZnGeP_2$) or the like. In addition, the lens 150 may include, for example, a metal material.

The lens 150 may include a highly conductive metal material on which a surface plasmon excitation may occur. For example, the lens 150 may include copper (Cu), aluminum (Al), nickel (Ni), iron (Fe), cobalt (Co), zinc (Zn), titanium (Ti), ruthenium (Ru), rhodium (Rh), palladium (Pd), platinum (Pt), silver (Ag), osmium (Os), iridium (Ir), gold (Au), or an alloy thereof. The lens 150 may include a two-dimensional material with a relatively higher conductivity such as graphene, or a conductive oxide.

Figure 2:
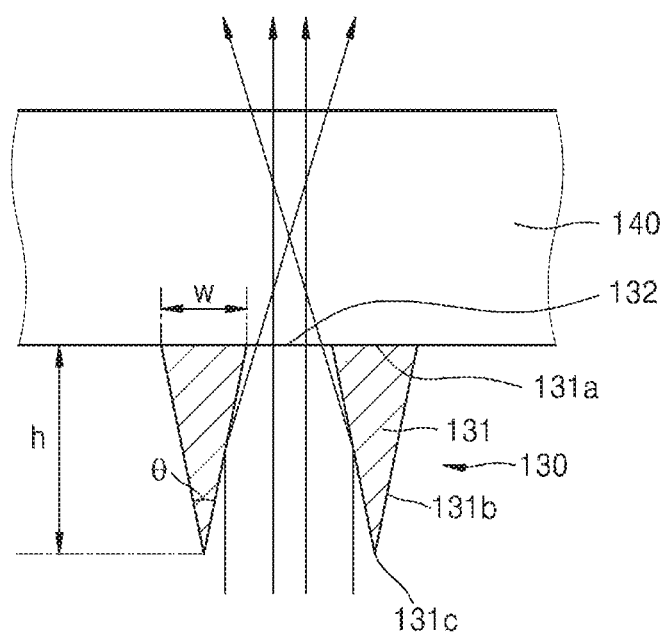
FIG. 2 is a partial longitudinal cross-sectional view schematically illustrating a configuration of some reflection patterns of a reflective pattern mask used in the structured-light projector shown in FIG. 1.

The pattern mask 130 may be arranged on a bottom surface of the transparent substrate 140 to face the illuminating device 120. The pattern mask 130 partially transmits or reflects illumination light emitted from the illuminating device 120 to produce structured light. For example, FIG. 2 is a partial longitudinal cross-sectional view schematically illustrating a configuration of some reflection patterns of the reflective pattern mask 130 used in the structured-light projector 100 shown in FIG. 1. Referring to FIG. 2, the pattern mask 130 may include a light-transmitting slit 132 transmitting incident illumination light and a plurality of reflection patterns 131 obliquely reflecting the incident illumination light towards the light-transmitting slit 132. The light-transmitting slit 132 may be arranged between the plurality of reflection patterns 131. The light-transmitting slit 132 may transmit the incident illumination light. Therefore, the illumination light incident on the light-transmitting slit 132 may pass through the light-transmitting slit 132 and the transparent substrate 140, and be projected to the outside of the structured-light projector 100 by the lens 150.

Each of the plurality of reflection patterns 131 may include a bottom surface 131a in contact with a surface of the transparent substrate 140, a reflective surface 131b, which is inclined from a direction normal to the transparent substrate, obliquely reflecting the illumination light, and a tip portion 131c opposite to the bottom surface 131a and in which the two or more reflective surfaces 131b are joined. The tip portion 131c may be, for example, face a central portion of the bottom surface 131a and the reflective surface 131b may obliquely extend from the tip portion 131c to an edge of the bottom surface 131a. For example, each of the plurality of reflection patterns 131 may have a longitudinal section of an isosceles triangular shape.

The reflection patterns 131 may include a metal material having higher reflectivity with respect to the illumination light. The illumination light incident on the reflective surface 131b may be obliquely reflected by the reflective surface 131b and be incident on the light-transmitting slit 132. The illumination light reflected by the reflective surface 131b may pass through the light-transmitting slit 132 and the transparent substrate 140, and be projected to the outside of the structured-light projector 100 by the lens 150. Therefore, the illumination light incident on the reflection pattern 131 may contribute to form the structured light without being lost, such that a light utilization efficiency of the structured-light projector 100 may be improved and a brightness of the structured light may be increased. In addition, a power consumption of the illuminating device 120 may be reduced and a power consumption of the structured-light projector 100 may be reduced.

When an incident angle of the illumination light reflected by the reflection pattern 131 incident to the light-transmitting slit 132 is relatively large, the illumination light reflected by the reflection pattern 131 may not be sufficiently condensed by the lens 150. The incident angle is an angle between a traveling direction of the illumination light reflected by the reflective surface 131b and a surface normal of the light-transmitting slit 132. When the incident angle is larger than a predetermined angle, the illumination light reflected by the reflection pattern 131 may deviate out of a region where the structured light is to be projected, and thus may not contribute to form the structured light. When each of the plurality of reflection patterns 131 may have a longitudinal section of an isosceles triangular shape, the incident angle may be equal to ½ of an internal angle θ of the tip portion 131c of the reflection pattern 131.

Therefore, to have an incident angle that enable reflected light to be incident on the light-transmitting slit, each of the plurality of reflection patterns 131 may have a relatively high aspect ratio. Here, the aspect ratio indicates a ratio h/w of a height h of the reflection pattern 131 to a width of the bottom surface 131a of the reflection pattern 131. Because the reflection pattern 131 may be difficult to be formed when the aspect ratio is too high, the aspect ratio of each of the plurality of reflection patterns 131 may be, for example, about 5 to 15. The internal angle θ of the tip portion 131c of each of the plurality of reflection patterns 131 may be, for example, about 10 degrees to 20 degrees. A value of the aspect ratio of the reflection pattern 131 may be determined according to a light condensing power of the lens 150. The reflection pattern 131 may have a relatively small size. For example, the height h of the reflection pattern 131 may be in a range of about 3 μm to 10 μm, and the width of the reflection pattern 131 may be greater than 0 μm and less than 3 μm.

Figure 3:
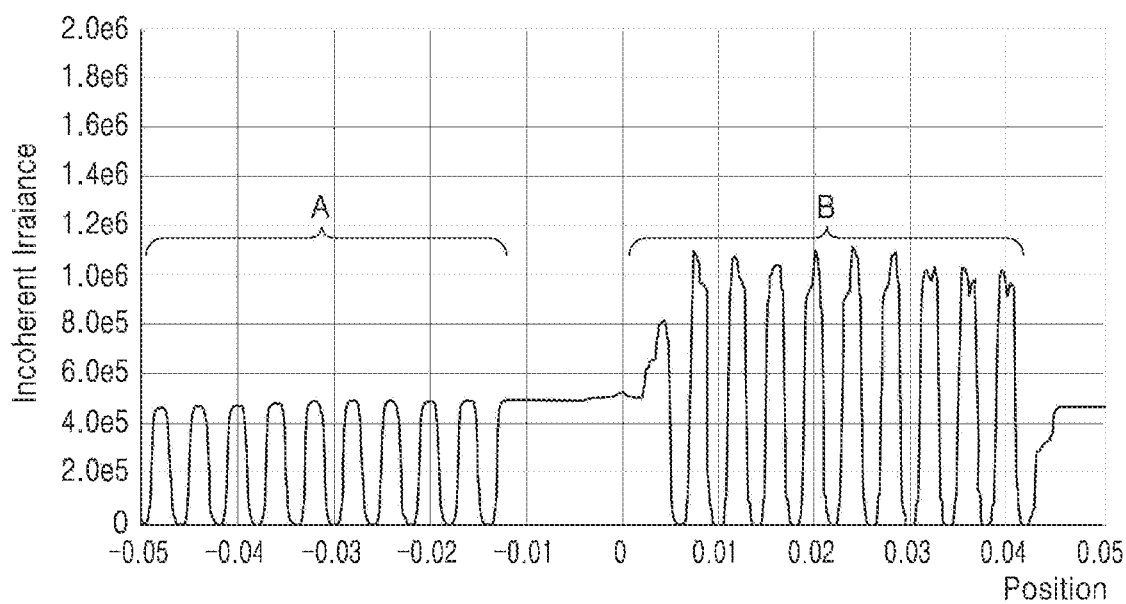
FIG. 3 is a graph showing a comparison between brightness of structured light in an example of using the reflective pattern mask shown in FIG. 2 and an example of using a pattern mask which absorbs light.

FIG. 3 is a graph showing a comparison between a brightness of structured light in an example of using the reflective pattern mask 130 shown in FIG. 2 and an example of using a light absorbing pattern mask that only absorbs light. A graph labeled 'A' in FIG. 3 shows an intensity of structured light measured at a position of the lens 150 when using the light absorbing pattern mask and a graph labeled in 'B' shows an intensity of structured light measured at a position of the lens 150 when using the reflective pattern mask 130 shown in FIG. 2. As shown in FIG. 3, when the reflective pattern mask 130 shown in FIG. 2 is used, the light utilization efficiency of the structured-light projector 100 may be improved and the brightness of structured light may be increased.

In addition, since the illumination light reflected by the reflection pattern 131 may contribute to form the structured light, a same effect as that of increasing a number of light-emitting elements of the illuminating device 120 may be obtained. When the number of light-emitting elements of the illuminating device 120 is increased, an intensity distribution of the illumination light incident on the pattern mask 130 may be uniform even when a distance between the pattern mask 130 and the illuminating device 120 is small. Thus, a thickness of the structured-light projector 100 may be reduced. In the case of using the light absorbing pattern mask, a portion of the illumination light may be reflected by the pattern mask incident on an inside of a laser resonator of the light-emitting elements, thereby lowering an operational stability of the light-emitting elements. According to an example embodiment, since the illumination light is obliquely reflected when the reflective pattern mask 130 shown in FIG. 2 is used, the reflected illumination light is not incident on the light-emitting elements of the illuminating device 120. Therefore, the operational stability of the light-emitting elements may be improved.

In the pattern mask 130 described above, the illumination light may pass only through the light-transmitting slit 132 and not through the bottom surface 131a of each of the plurality of reflection patterns 131. Therefore, since the illumination light provided by the illuminating device 120 only passes the light-transmitting slit 132, structured light having a predetermined pattern may be formed. The structured light may be a distribution of beam spots forming a ray of light traveling in space. The distribution of the beam spots may be determined according to a shape of each light-transmitting slit 132 and an arrangement form of a plurality of light-transmitting slits 132, or a shape of the bottom surface 131a of each of the plurality of reflection patterns 131 and an arrangement form of the bottom surfaces 131a of the plurality of reflection patterns 131. The structured light may be a mathematically coded pattern to uniquely designate an angle, a direction, and a position coordinate as light and dark points pass through each point on a focal plane. Such a pattern may be used to recognize a three-dimensional shape. A shape of the structured light projected to a three-dimensional object may be changed according to the object and imaged with an image pickup device such as a camera to track a degree of shape change of a pattern of each coordinate, such that depth information of the object of a three-dimensional shape may be extracted.

Figure 4:
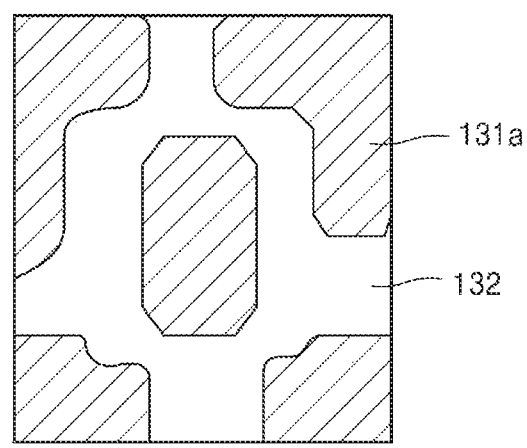
FIG. 4 is a horizontal cross-sectional view exemplarily showing bottom surface shapes of example reflection patterns of the reflective pattern mask.

FIG. 4 is a horizontal cross-sectional view exemplarily showing a shape of the bottom surface 131a of some reflection patterns 131 of the reflective pattern mask 130. Referring to FIG. 4, the pattern mask 130 may include the plurality of fine reflection patterns 131 having various shapes of the bottom surface 131a, and an array of the plurality of fine light-transmitting slits 132. Particular shapes and arrays of the plurality of reflection patterns 131 and the plurality of light-transmitting slits 132 may be variously designed as needed. For example, the particular shapes and arrays of the plurality of reflection patterns 131 and the plurality of light-transmitting slits 132 may be designed according to a pattern shape of structured light to be projected.

Figure 5A:
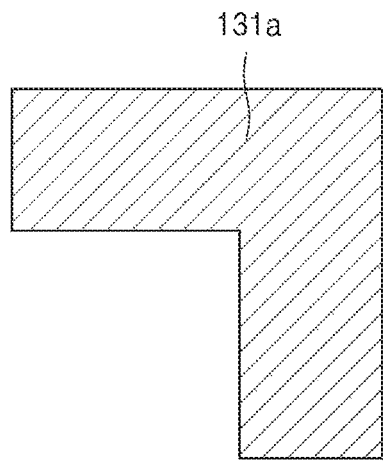
FIG. 5A is a cross-sectional view exemplarily showing a shape of a bottom surface of an example reflection pattern of the reflective pattern mask.
Figure 5B:
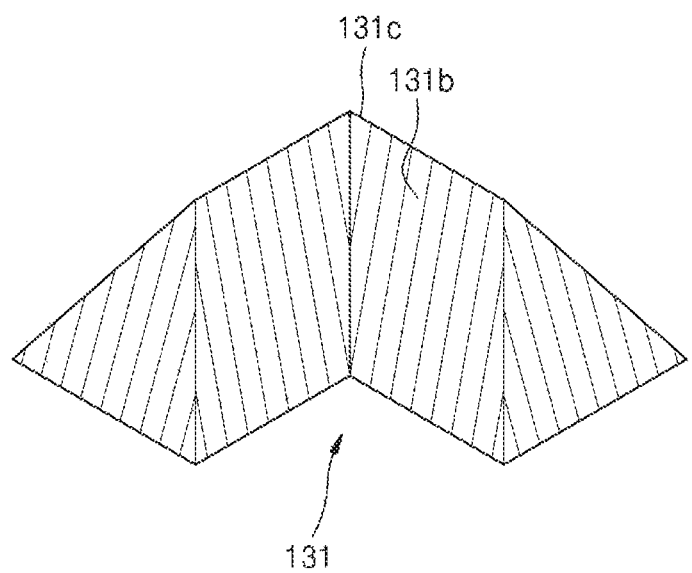
FIG. 5B is a perspective view showing the shapes of a reflective surface and a tip portion of the reflection pattern shown in FIG. 5A.

The reflection pattern 131 may be formed in a mountain shape whose width gradually decreases from the bottom surface 131a to the tip portion 131c in a height direction. The tip portion 131c of the reflection pattern 131 may have a shape of a line instead of a single point. For example, FIG. 5A is a cross-sectional view exemplarily showing a bottom surface 131a of an example reflection pattern 131 of the reflective pattern mask 130. FIG. 5B is a perspective view showing shapes of the reflective surface 131b of the reflection pattern 131 and the tip portion 131c. As shown in FIG. 5A, the bottom surface 131a of the reflection pattern 131 may have an L shape of a line bent by 90 degrees. The bottom surface 131a of the reflection pattern 131 may have a hexagonal shape having six sides. In this example, a three-dimensional shape of the reflection pattern 131 becomes a mountain shape having six reflective surfaces 131b obliquely extending at almost identical angles from six sides of the bottom surface 131a, as shown in FIG. 5B. Similar to the bottom surface 131a, the tip portion 131c of the reflection pattern 131 may have an L shape of a line bent at 90 degrees. When the tip portion 131c is projected toward the bottom surface 131a in a direction normal to the bottom surface 131a, the tip portion 131c may be positioned substantially at a center of the bottom surface 131a.

Figure 6A:
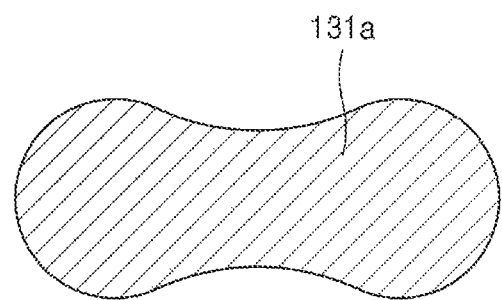
FIG. 6A is a cross-sectional view exemplarily showing a bottom surface shape of an example reflection pattern of the reflective pattern mask.
Figure 6B:
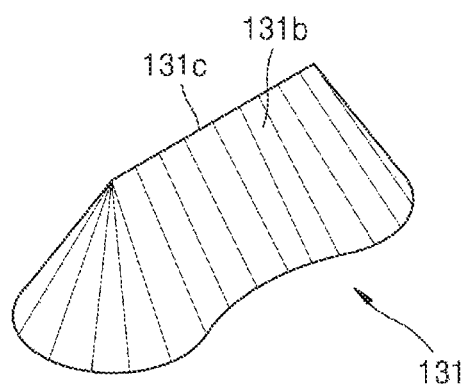
FIG. 6B is a perspective view showing a reflective surface and a shape of a tip portion of the reflection pattern shown in FIG. 6A.

FIG. 6A is a cross-sectional view exemplarily showing a shape of the bottom surface 131a of an example reflection pattern 131. FIG. 6B is a perspective view showing the reflective surface 131b and a shape of the tip portion 131c of the reflection pattern 131 shown in FIG. 6A. As shown in FIG. 6A, the bottom surface 131a of the reflection pattern 131 may have a dumbbell shape having both rounded ends and a narrow central portion. In this example, the shape of the reflection pattern 131 may be a mountain shape having the reflective surface 131b of a curved surface shape obliquely extending at substantially a same angle from an edge of the bottom surface 131a, as shown in FIG. 6B. When the bottom surface 131a of the reflection pattern 131 is vertically symmetrical, the tip portion 131c may have a straight line shape.

Figure 7:
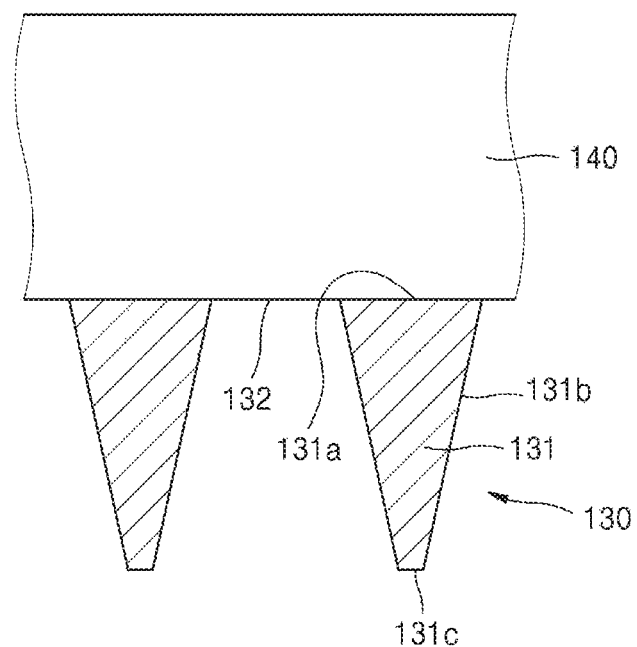
FIG. 7 is a partial longitudinal cross-sectional view schematically showing an example configuration of example reflection patterns of the reflective pattern mask used in the structured-light projector shown in FIG. 1.
Figure 8:
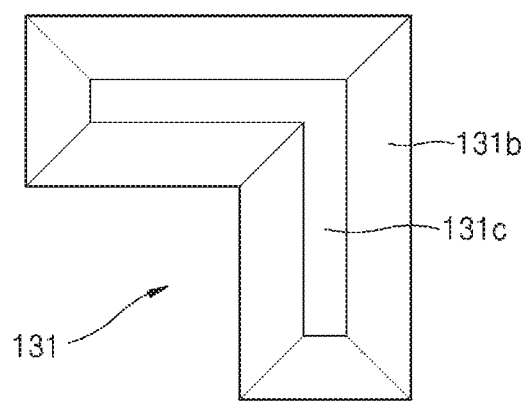
FIG. 8 is a plan view of a reflective surface and a shape of a tip portion of the reflection pattern shown in FIG. 7.

As shown in FIGS. 5A, 5B, 6A, and 6B, the tip portion 131c of the reflection pattern 131 may be sharp and having a line shape, but example embodiments are not limited thereto. For example, FIG. 7 is a partial longitudinal-sectional view schematically showing an example configuration of some reflection patterns 131 of the reflective pattern mask 130 used in the structured-light projector 100 shown in FIG. 1. Referring to FIG. 7, an end of the reflection pattern 131 may be cut such that the reflection pattern 131 may have an isosceles trapezoidal shape. In addition, FIG. 8 is a plan view of the reflective surface 131b and a shape of the tip portion 131c of the reflection pattern 131 shown in FIG. 7. Referring to FIG. 8, when the reflection pattern 131 has an L shape bent at 90 degrees, the tip portion 131c may also have an L shape of a 90-degrees bent surface.

Figure 9:
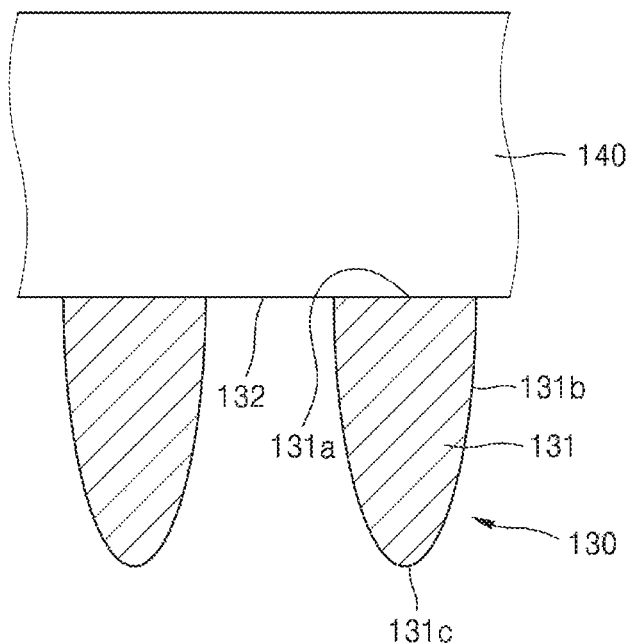
FIG. 9 is a partial longitudinal cross-sectional view schematically showing an example configuration of example pattern masks of the reflective pattern mask used in the structured-light projector shown in FIG. 1.

FIG. 9 is a partial longitudinal-sectional view schematically showing an example configuration of some reflection patterns 131 of the reflective pattern mask 130 used in the structured-light projector 100 shown in FIG. 1. As shown in FIG. 9, in an actual manufacturing process of the reflective pattern mask 130, the reflective surface 131b and the tip portion 131c of the reflection pattern 131 may have a curved surface shape. For example, the reflective surface 131b may have a curved surface having a relatively large radius of curvature as compared with the tip portion 131c. The tip portion 131c may have a curved surface having a relatively small radius of curvature as compared with the reflective surface 131b.

Figure 10:
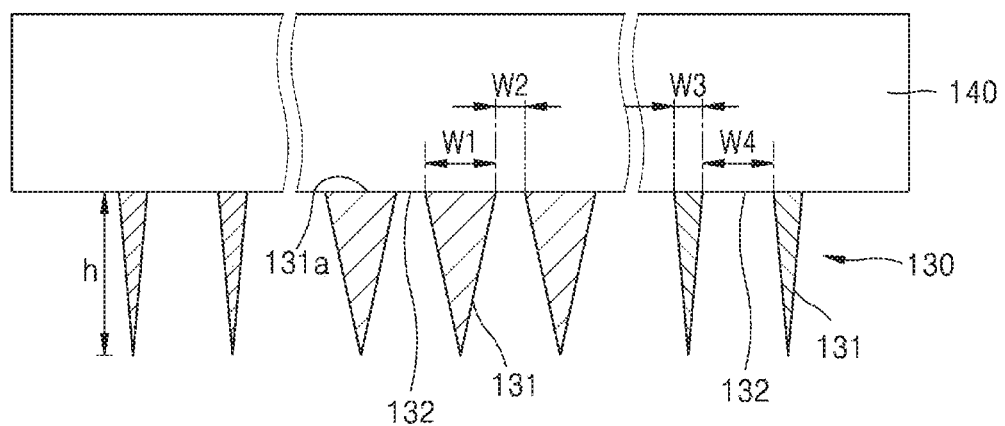
FIG. 10 is a partial longitudinal cross-sectional view schematically showing an example configuration of example reflection patterns of the reflective pattern mask used in the structured-light projector shown in FIG. 1.

A width of the bottom surface 131a of the reflection pattern 131 and a slit width of the light-transmitting slit 132 may be uniform over an entire region of the pattern mask 130, and may vary locally depending on the region of the pattern mask 130. For example, FIG. 10 is a partial longitudinal cross-sectional view schematically showing an example configuration of some reflection patterns 131 of the reflective pattern mask 130 used in the structured-light projector 100 shown in FIG. 1. Referring to FIG. 10, in a central region of the pattern mask 130, a width w1 of the bottom surface 131a of the reflection pattern 131 may be greater than a slit width w2 of the light-transmitting slit 132 (w1>w2). In an edge region of the pattern mask 130, a width w3 of the bottom surface 131a of the reflection pattern 131 may be reduced compared to w1 and a slit width w4 of the light-transmitting slit 132 may be increased compared to w2. The width w1 of the bottom surface 131a of the reflection pattern 131 arranged in the central region of the pattern mask 130 may be greater than the width w3 of the bottom surface 131a of the reflection pattern 131 arranged in the edge region of the pattern mask 130 (w1>w3). The slit width w2 of the light-transmitting slit 132 arranged in the central region of the pattern mask 130 may be less than the slit width w4 of the light-transmitting slit 132 arranged in the edge region of the pattern mask 130 (w2<w4). According to an example embodiment, the width w3 of the bottom surface 131a of the reflection pattern 131 in the edge region of the pattern mask 130 may be less than the slit width w4 of the light-transmitting slit 132 in the edge region of the pattern mask 130 (w3<w4).

A height h of the reflection pattern 131 may be substantially constant over the entire region when the pattern mask 130 irrespective of a width variation of the bottom surface 131a of the reflection pattern 131. An aspect ratio h/w1 of the reflection pattern 131 arranged in the central region of the pattern mask 130 may be less than an aspect ratio h/w3 of the reflection pattern 131 arranged in the edge region of the pattern mask 130.

According to an example embodiment of the pattern mask 130 shown in FIG. 10, since the slit width w2 of the light-transmitting slit 132 arranged in the central region is less than the slit width w4 of the light-transmitting slit 132 arranged in the edge region, an average light transmittance of the central region of the pattern mask 130 may be less than an average light transmittance of the edge region of the pattern mask 130. Using such properties, the pattern mask 130 may compensate for non-uniformity in brightness of the structured light due to distortion of the lens 150. For example, when the lens 150 has pincushion distortion, corner portions of the structured light may be more expanded. The central region of the structured light emerging from a central portion of the lens 150 may be relatively bright, and the edge region of the structured light emerging from a periphery portion of the lens 150 may be relatively dark. However, when the pattern mask shown in FIG. 10 is used, since the brightness of the central portion of the structured light is relatively reduced and the brightness of the edge region of the structured light is relatively increased, the brightness of the structured light in the entire region of the structured light may be made relatively uniform when the lens 150 has the pincushion distortion.

Figure 11:
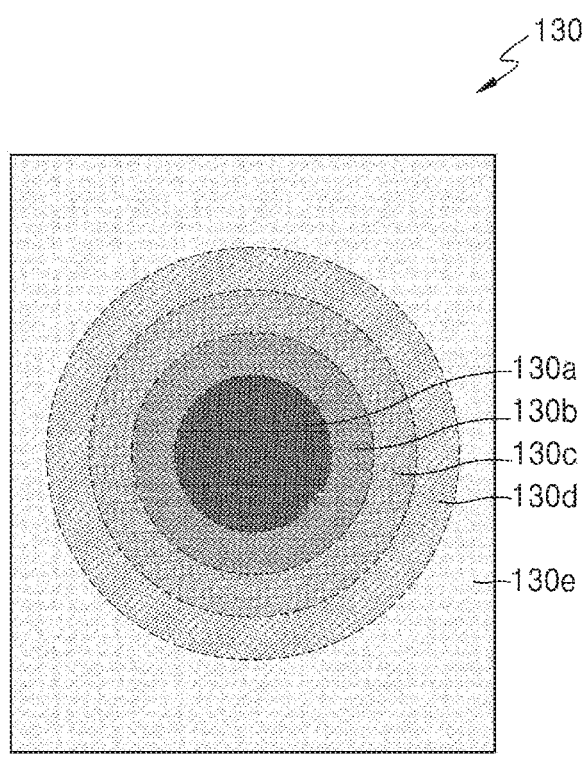
FIG. 11 is a plan view showing an example of a pattern mask used in the structured-light projector shown in FIG. 1.

The pattern mask 130 having only two different regions is shown in FIG. 10. However, since the distortion of the lens 150 appears radically from a center of lens 150, the pattern mask 130 may have a plurality of regions arranged in, for example, concentric circles. For example, FIG. 11 is a plan view showing an example of the pattern mask 130 used in the structured-light projector 100 shown in FIG. 1. Referring to FIG. 11, a plurality of lens distortion compensation regions 130a, 130b, 130c, 130d, and 130e arranged in concentric circles may be included such that the pattern mask 130 may correct the non-uniformity in brightness of the structured light due to the distortion of the lens 150. A first lens distortion compensation region 130a is arranged to face the central portion of the lens 150. A second lens distortion compensation region 130b is arranged to surround the first lens distortion compensation region 130a. Third through fifth lens distortion compensation region 130c, 130d, and 130e are sequentially arranged outside the second lens distortion compensation region 130b. For example, the first lens distortion compensation region 130a may correspond to the central region of the pattern mask 130 shown in FIG. 10 and the fifth lens distortion compensation region 130e may correspond to the edge region of the pattern mask 130 shown in FIG. 10. Although five lens distortion compensation regions 130a, 130b, 130c, 130d, and 130e are illustrated as an example in FIG. 11, a number of lens distortion compensation regions may be variously selected depending on a degree of distortion of the lens 150.

The plurality of reflection patterns 131 and the plurality of light-transmitting slits 132 may be arranged in each of the first through fifth lens distortion compensation regions 130*a*, 130*b*, 130*c*, 130*d*, and 130*e*. To correct the non-uniformity in brightness of the structured light, light transmittances of the first through fifth lens distortion compensation regions 130*a*, 130*b*, 130*c*, 130*d*, and 130*e* may be different from each other. For example, the light transmittance of the first lens distortion compensation region 130*a* may be the lowest, and the light transmittance may gradually increase from the second lens distortion compensation region 130*b* to the fifth lens distortion compensation region 130*e*. For this purpose, a width of the bottom surface 131*a* of the reflection pattern 131 or a slit width of the light-transmitting slit 132 in the first through fifth lens distortion compensation regions 130*a*, 130*b*, 130*c*, 130*d*, and 130*e* may be different from each other. For example, the width of the bottom surface 131*a* of the reflection pattern 131 may decrease and the slit width of the light-transmitting slit 132 may increase from the first lens distortion compensation region 130*a* to the fifth lens distortion compensation region 130*e*.

In this example, a ratio of an area of the plurality of light-transmitting slits 132 to a total area of the bottom surfaces 131*a* of the plurality of reflection patterns 131 inside the second lens distortion compensation region 130*b* may be greater than a ratio of an area of the light-transmitting slit 132 to a total area of the bottom surfaces 131*a* of the reflection pattern 131 inside the first lens distortion compensation region 130*a*. Similarly, a ratio of an area of the plurality of light-transmitting slits 132 to a total area of the bottom surfaces 131*a* of the reflection pattern 131 inside the third lens distortion compensation region 130*c* may be greater than a ratio of an area of the light-transmitting slit 132 to a total area of the bottom surfaces 131*a* of the reflection pattern 131 inside the second lens distortion compensation region 130*b*. A ratio of an area of the plurality of light-transmitting slits 132 to a total area of the bottom surfaces 131*a* of the plurality of reflection patterns 131 may be increased from the first lens distortion compensation region 130*a* to the fifth lens distortion compensation region 130*e*. Therefore, the light transmittance may be gradually increased from the first lens distortion compensation region 130*a* to the fifth lens distortion compensation region 130*e*.

Figure 12:
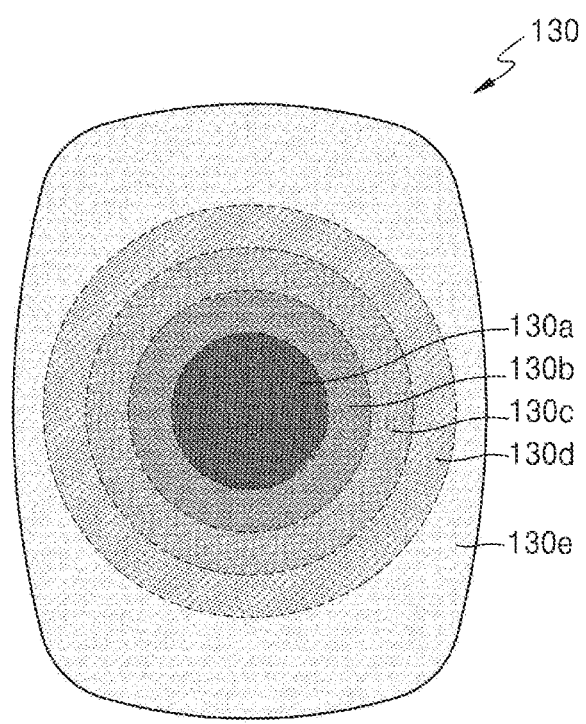
FIG. 12 is a plan view of an example of a pattern mask used in the structured-light projector shown in FIG. 1.

In FIG. 11, the pattern mask 130 is shown as having a rectangular shape. In this example, a cross-sectional shape of the structured light may have a shape other than a rectangular shape due to the distortion of the lens 150. For example, when the lens 150 has the pincushion distortion, as an edge portion of the structured light expands, a middle portion of each side of the structured light becomes concave, and an edge of the structured light may be enlarged. Therefore, the pattern mask 130 may have a shape other than a rectangular shape such that the structured light has a rectangular shape. For example, FIG. 12 is a plan view of an example of the pattern mask 130 used in the structured-light projector 100 shown in FIG. 1. Referring to FIG. 12, in view of the distortion of the lens 150, an edge of the pattern mask 130 may be rounded and the middle portion of each side of the pattern mask 130 may be convexly formed. When the lens 150 has the pincushion distortion, the structured light may have a rectangular shape as the edge portion expands and the middle portion of each side becomes concave.

In this example, the central region of the structured light emerging from the central portion of the pattern mask 130 is relatively bright and the edge region of the structured light emerging from the peripheral portion of the pattern mask 130 is relatively dark. Thus, the average brightness of the structured light on a cross-section of the structured light may not be constant. Therefore, the pattern mask 130 may include the first through fifth lens distortion compensation regions 130*a*, 130*b*, 130*c*, 130*d*, and 130*e* arranged in a concentric shape to correct the non-uniformity in brightness of the structured light. Shapes of the first through fifth lens distortion compensation regions 130*a*, 130*b*, 130*c*, 130*d*, and 130*e* are determined according to the properties of the lens 150 regardless of a contour shape of the pattern mask 130. Therefore, when the lens 150 in FIGS. 11 and 12 are the same, the shapes of the first through fifth lens distortion compensation regions 130*a*, 130*b*, 130*c*, 130*d*, and 130*e* in the pattern mask 130 shown in FIG. 11 and the pattern mask 130 shown in FIG. 12 may be the same.

Figure 13:
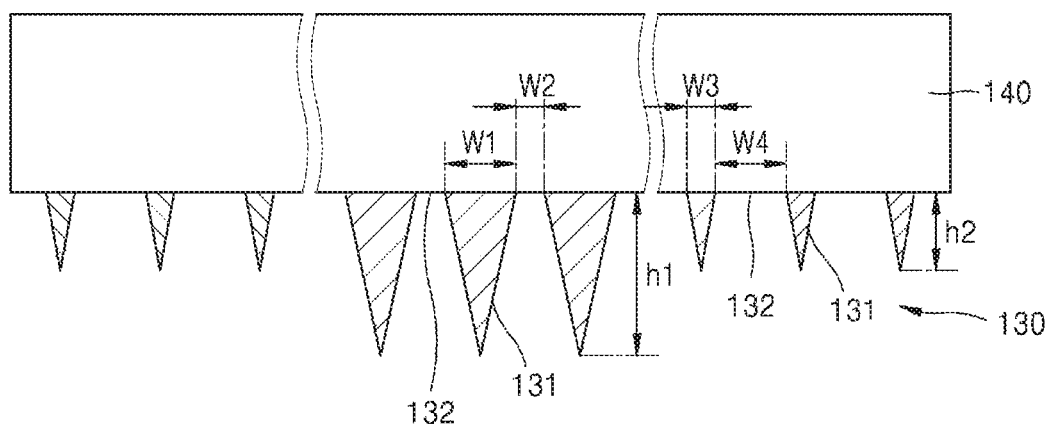
FIG. 13 is a partial longitudinal cross-sectional view schematically showing an example configuration of example reflection patterns of the reflective pattern mask used in the structured-light projector shown in FIG. 1.

In the pattern mask 130 shown in FIG. 10, although the aspect ratio of the reflection pattern 131 varies depending on the region, the aspect ratio is not limited thereto. For example, FIG. 13 is a partial longitudinal cross-sectional view schematically showing another configuration of some reflection patterns 131 of the reflective pattern mask 130 used in the structured-light projector 100 shown in FIG. 1. Referring to FIG. 13, in the central region of the pattern mask 130, the width w1 of the bottom surface 131*a* is greater than the slit width w2 of the light-transmitting slit 132 (w1>w2). In an edge region of the pattern mask 130, a width w3 of the bottom surface 131*a* of the reflection pattern 131 is reduced compared to w1 and a slit width w4 of the light-transmitting slit 132 is increased compared to w3. Therefore, the width w1 of the bottom surface 131*a* of the reflection pattern 131 arranged in the central region of the pattern mask 130 is greater than the width w3 of the bottom surface 131*a* of the reflection pattern 131 arranged in the edge region of the pattern mask 130 (w1>w3). The slit width w2 of the light-transmitting slit 132 arranged in the central region of the pattern mask 130 is less than the slit width w4 of the light-transmitting slit 132 arranged in the edge region of the pattern mask 130 (w2<w4). In addition, the width w3 of the bottom surface 131*a* of the reflection pattern 131 in the edge region of the pattern mask 130 may be less than the slit width w4 of the light-transmitting slit 132 in the edge region of the pattern mask 130 (w3<w4).

According to the embodiment shown in FIG. 13, the aspect ratio of the reflection pattern 131 may be constantly maintained over the entire region of the pattern mask 130 irrespective of the width of the bottom surface 131*a* of the reflection pattern 131. Therefore, a height h1 of the reflection pattern 131 arranged in the central region of the pattern mask 130 may be greater than a height h2 of the reflection pattern 131 arranged in the edge region of the pattern mask 130.

Figure 14:
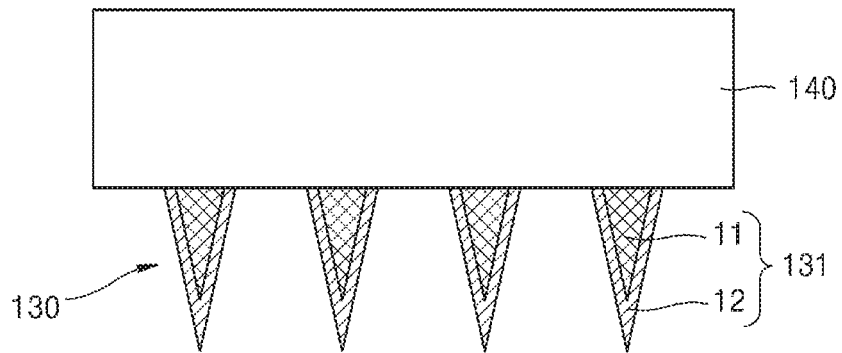
FIG. 14 is a partial longitudinal cross-sectional view schematically showing an example configuration of a plurality of reflection patterns of the reflective pattern mask used in the structured-light projector shown in FIG. 1.

The reflection pattern 131 may include reflective metal, but example embodiments are not limited thereto, and the reflection pattern 131 may be implemented in various other forms. For example, FIG. 14 is a partial longitudinal cross-sectional view schematically showing an example configuration of the reflection pattern 131 of the reflective pattern mask 130 used in the structured-light projector 100 shown in FIG. 1. Referring to FIG. 14, the reflection pattern 131 may include a core portion 11 arranged on a lower surface of the transparent substrate 140, and an external portion 12 surrounding a surface of the core portion 11. The core portion 11 may have, like the reflection pattern 131, a longitudinal section of a triangle shape or a trapezoidal shape. The core portion 11 may include, for example, a semiconductor material or a dielectric material which may be easily patterned. The external portion 12, which is formed by coating the surface of the core portion 11, may include a metal material having a relatively high reflectivity to the illumination light.

Figure 15:
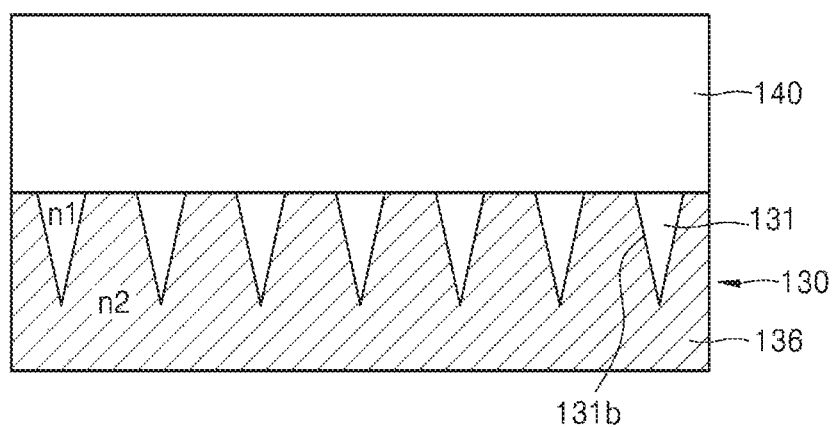
FIG. 15 is a partial longitudinal cross-sectional view schematically showing an example configuration of a plurality of reflection patterns of the reflective pattern mask used in the structured-light projector shown in FIG. 1.

In addition, FIG. 15 is a partial longitudinal cross-sectional view schematically showing an example configuration of the plurality of reflection patterns 131 of the reflective pattern mask 130 used in the structured-light projector 100 shown in FIG. 1. Referring to FIG. 15, the pattern mask 130 may further include a high refractive index layer 136, which is transparent, arranged on the lower surface of the transparent substrate 140 such that the plurality of light-transmitting slits 132 and the plurality of reflection patterns 131 are all fully covered and encapsulated. The reflection pattern 131 may include a dielectric material having a refractive index n1 which is lower than a refractive index n2 of the high refractive index layer 136 (n1<n2), and not a metal material. For example, the high refractive index layer 136 may include a material such as silicon dioxide ($SiO_2$), $TiO_2$, silicon nitride ($SiN_3$), ZnS, zinc selenide (ZnSe), and $Si_3N_4$, and the reflection pattern 131 may be a void space between the high refractive index layer 136 and the transparent substrate 140, or may be filled with air. In this example, a total reflection may occur at the reflective surface 131b of the reflection pattern 131. To cause the total reflection to occur with respect to the illumination light perpendicularly incident on the high refractive index layer 136, the reflective surface 131b is formed such that an internal angle formed by the reflective surface 131b with the lower surface of the transparent substrate 140, or an internal angle formed by the reflective surface 131b with the bottom surface 131a is greater than a critical angle.

Figure 16:
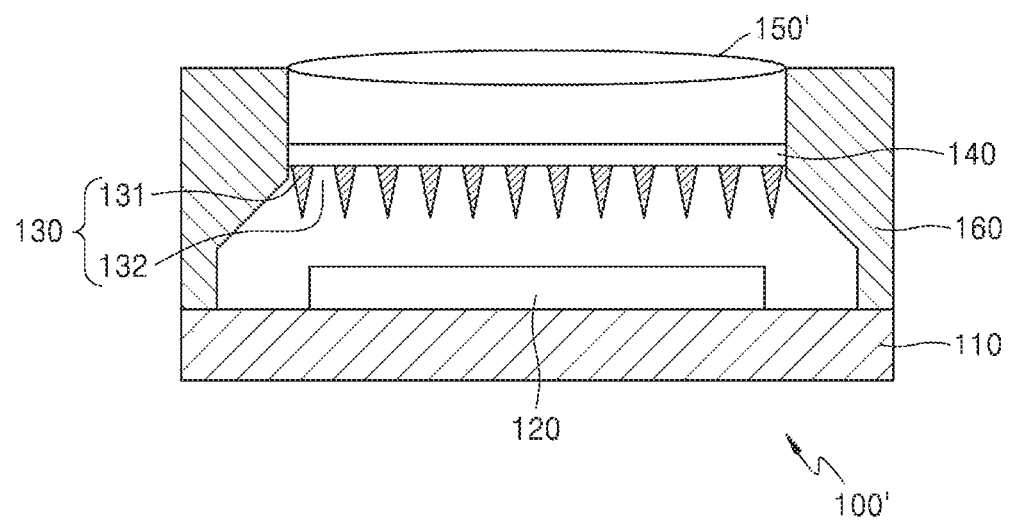
FIG. 16 is a cross-sectional view of a schematic configuration of a structured-light projector according to an example embodiment.

In addition, FIG. 16 is a cross-sectional view of a schematic configuration of a structured-light projector 100' according to an example embodiment. Referring to FIG. 16, the structured-light projector 100' may include a general refractive optical lens 150' instead of the lens 150 which is a metalens and include nano-columns. In this example, only the pattern mask 130 is arranged in the transparent substrate 140 and the refractive optical lens 150' may be arranged spaced apart from the upper surface of the transparent substrate 140. Therefore, the refractive optical lens 150' and the pattern mask 130 are arranged spaced apart from each other.

Since the structured-light projectors 100 and 100' having the above-described structure have higher light utilization efficiency, the structured light with improved brightness may be projected. Such structured-light projectors 100 and 100' may be used in various electronic apparatuses. For example, the structured-light projectors 100 and 100' may be used in a three-dimensional object recognition apparatus. Since the structured-light projectors 100 and 100' provide a significantly bright structured light, an accuracy of the three-dimensional sensing and a motion recognition of the three-dimensional object recognition apparatus may be improved.

Figure 17:
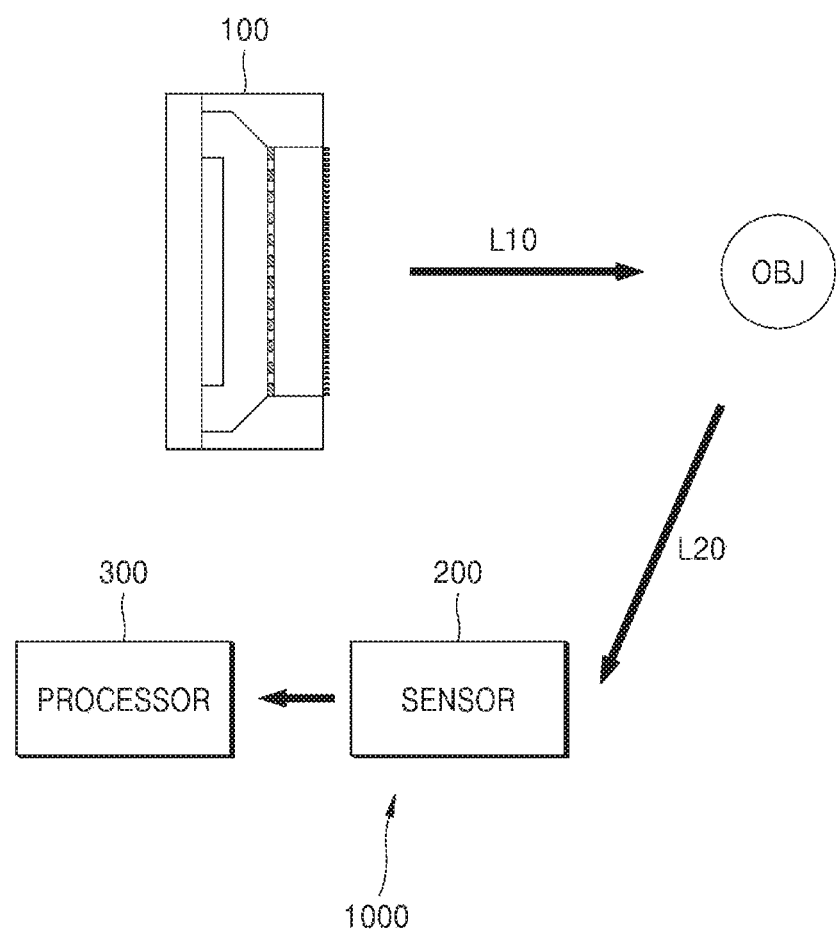
FIG. 17 is a block diagram of a schematic configuration of an electronic apparatus according to an example embodiment.

For example, FIG. 17 is a block diagram of a schematic configuration of an electronic apparatus 1000 according to an example embodiment. Referring to FIG. 17, the electronic apparatus 1000 may include the structured-light projector 100 projecting structured light L10 to an object OBJ, a sensor 200 receiving light L20 reflected from the object, and a processor 300 configured to perform an arithmetic operation to obtain shape information of the object OBJ from the light L20 received by the sensor 200. In addition, the sensor 200 may include an array of light detecting elements. The sensor 200 may further include a dispersing element to analyzing light reflected from the object OBJ by wavelength. As shown in FIG. 17, the electronic apparatus 1000 may include the structured-light projector 100 shown in FIG. 1, but example embodiments are not limited thereto. For example, the electronic apparatus 1000 may include the structured-light projector 100' shown in FIG. 16.

The processor 300 may compare the structured light L10 projected to the object OBJ and the structured light L20 reflected from the object OBJ to obtain depth information with respect to the object OBJ and analyze a three-dimensional shape, position, motion, or the like of the object OBJ from the depth information. The structured light L10 projected from the structured-light projector 100 may be a mathematically coded pattern to uniquely contain an angle and direction of a light beam and position coordinates of bright and dark points reaching a predetermined focal plane. When such a pattern is reflected in the three-dimensional object OBJ, the pattern of the structured light L20 reflected has a shape changed from a pattern of the structured light L10 projected. By comparing such patterns and tracking the pattern by coordinates, the depth information of the object OBJ may be extracted, and three-dimensional information related to the shape and motion of the object OBJ may be extracted from the depth information of the object OBJ. Besides, the processor 300 may also control overall operation of the electronic apparatus 1000, for example, light source provided in the structured-light projector 100 may be driven or an operation of the sensor 200 may be controlled.

The electronic apparatus 1000 may also include a memory in which a programmed computation module may be stored such that the processor 300 may execute a operation extracting three-dimensional information as described above.

Optical elements configured to adjust a direction of the structured light L10 from the structured-light projector 100 to face the object OBJ or further perform modulation thereof may be further arranged between the structured-light projector 100 and the object OBJ.

Information on a calculated result in the processor 300, that is, information with respect to a shape and position of the object OBJ may be transmitted to another unit or another electronic apparatus. For example, such information may be used in other application modules stored in the memory. Another electronic apparatus from which a result is transmitted may be a display device or a printer which outputs the result. In addition, the another electronic apparatus may be an autonomous driving device such as a unmanned vehicle, an autonomous vehicle, a robot, and a drone, a Smartphone, a smartwatch, a cell phone, a personal digital assistant (PDA), a laptop, a personal computer (PC), various wearable devices, other mobile or non-mobile computing devices and Internet of things, which is not limited thereto.

The electronic apparatus 1000 may be an autonomous driving device such as a unmanned vehicle, an autonomous vehicle, a robot, and a drone, a Smartphone, a smartwatch, a cell phone, a personal digital assistant (PDA), a laptop, a personal computer (PC), various wearable devices, other mobile or non-mobile computing devices and Internet of things, which is not limited thereto.

In the electronic apparatus according to example embodiments described, when software modules or algorithms are involved, these software modules may be stored as program instructions or computer readable codes executable on a processor on a computer-readable medium. Examples of the computer readable recording medium include read-only memory (ROM), random-access memory (RAM), CD-ROMs, magnetic tapes, hard disks, floppy disks, flash memory, optical data storage devices, and so on. The computer-readable recording medium may also be distributed over network coupled computer systems so that the computer readable code is stored and executed in a distributive manner. This media may be read by the computer, stored in the memory, and executed by the processor.

It should be understood that example embodiments described herein should be considered in a descriptive sense only and not for purposes of limitation. Descriptions of features or aspects within each embodiment should typically be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A structured-light projector comprising:
   an illuminating device configured to emit illumination light;
   a pattern mask configured to partially transmit the illumination light to generate structured light; and
   a lens configured to transmit the structured light,
   wherein the pattern mask comprises:
      a light-transmitting slit configured to transmit the illumination light, and
      a plurality of reflection patterns configured to obliquely reflect the illumination light toward the light-transmitting slit.

2. The structured-light projector of claim 1, wherein each of the plurality of reflection patterns comprises:
   a bottom surface;
   a tip portion opposite to the bottom surface; and
   a reflective surface obliquely extending from an edge of the bottom surface to the tip portion, and
   wherein the reflective surface is inclined to obliquely reflect the illumination light.

3. The structured-light projector of claim 2, wherein a ratio of a height of each of the plurality of the reflection patterns to a width of the bottom surface of each of the plurality of the reflection patterns is in a range of 5 to 15.

4. The structured-light projector of claim 2, wherein an internal angle of the tip portion is in a range of 10 degrees to 20 degrees.

5. The structured-light projector of claim 2, wherein the reflective surface has a curved surface and the tip portion has a curved surface.

6. The structured-light projector of claim 2, further comprising:
   a transparent substrate spaced apart from the illuminating device,
   wherein the pattern mask is disposed on a first surface of the transparent substrate, and
   the bottom surface of each of the plurality of reflection patterns is in contact with the first surface of the transparent substrate.

7. The structured-light projector of claim 6, wherein the lens is disposed on a second surface of the transparent substrate, the second surface being opposite to the first surface of the transparent substrate, and the lens is a meta-lens comprising a plurality of nano-sized columns.

8. The structured-light projector of claim 1, wherein the pattern mask comprises a first lens distortion compensation region disposed opposite to a central portion of the lens and a second lens distortion compensation region surrounding the first lens distortion compensation region, and wherein the first lens distortion compensation region and the second lens distortion compensation region are disposed concentrically.

9. The structured-light projector of claim 8, wherein a width of a bottom surface of each of the plurality of the reflection patterns included in the first lens distortion compensation region is greater than a width of a bottom surface of each of the plurality of the reflection patterns included in the second lens distortion compensation region, and
   a width of the light-transmitting slit included in the first lens distortion compensation region is less than a width of the light-transmitting slit included in the second lens distortion compensation region.

10. The structured-light projector of claim 9, wherein a height of each of the plurality of reflection patterns included in the first lens distortion compensation region is the same as a height of each of the plurality of the reflection patterns included in the second lens distortion compensation region.

11. The structured-light projector of claim 10, wherein a ratio of the height to the width of the bottom surface of each of the plurality of the reflection patterns included in the first lens distortion compensation region is less than a ratio of the height to the width of each of the plurality of reflection patterns included in the second lens distortion compensation region.

12. The structured-light projector of claim 9, wherein a height of each of the plurality of the reflection patterns included in the first lens distortion compensation region is greater than a height of each of the plurality of the reflection patterns included in the second lens distortion compensation region.

13. The structured-light projector of claim 12, wherein a ratio of the height to the width of the bottom surface of each of the plurality of reflection patterns included in the first lens distortion compensation region is the same as a ratio of the height to the width of the bottom surface of each of the plurality of reflection patterns included in the second lens distortion compensation region.

14. The structured-light projector of claim 9, wherein a ratio of a total area of the light-transmitting slit to a total area of the bottom surfaces of the reflection patterns included in the second lens distortion compensation region is greater than a ratio of a total area of the light-transmitting slit to a total area of the bottom surfaces of the reflection patterns included in the first lens distortion compensation region.

15. The structured-light projector of claim 1, wherein each of the plurality of reflection patterns has a longitudinal section of a triangle shape or a trapezoidal shape.

16. The structured-light projector of claim 1, wherein each of the plurality of reflection patterns comprises a reflective metal material.

17. The structured-light projector of claim 1, wherein each of the plurality of reflection patterns comprises a core portion and an external portion surrounding a surface of the core portion, and
   wherein the external portion comprises a reflective metal material.

18. The structured-light projector of claim 17, wherein the core portion has a longitudinal cross-section of a triangle shape or a trapezoidal shape.

19. The structured-light projector of claim 1, wherein the pattern mask further comprises a transparent high-refractive-index layer that covers the light-transmitting slit and the plurality of reflection patterns.

20. The structured-light projector of claim 19, wherein the plurality of reflection patterns comprises a dielectric material having a refractive index that is lower than a refractive index of the high-refractive-index layer.

21. The structured-light projector of claim 20, wherein each of the reflection patterns comprises a bottom surface and a reflective surface obliquely extending from an edge of the bottom surface, and
   wherein an internal angle of the reflective surface with the bottom surface is greater than a critical angle.

22. The structured-light projector of claim 1, wherein the lens is a refractive optical lens spaced apart from the pattern mask.

23. An electronic apparatus comprising:
   a structured-light projector configured to generate structured light to an object;
   a sensor configured to receive light reflected from the object; and
   a processor configured to obtain shape information of the object based on the light received from the sensor,
   wherein the structured-light projector comprises:
      an illuminating device configured to emit illumination light;
      a pattern mask configured to partially transmit the illumination light to generate structured light; and
      a lens configured to transmit the structured light,
      wherein the pattern mask comprises:
         a light-transmitting slit configured to transmit the illumination light, and
         a plurality of reflection patterns configured to obliquely reflect the illumination light toward the light-transmitting slit.

* * * * *